(12) United States Patent
Shaffer et al.

(10) Patent No.: US 8,588,377 B2
(45) Date of Patent: Nov. 19, 2013

(54) METHOD AND SYSTEM FOR GROUPING VOICE MESSAGES

(75) Inventors: Shmuel Shaffer, Palo Alto, CA (US);
Labhesh Patel, San Francisco, CA (US);
Mukul Jain, San Jose, CA (US);
Sanjeev Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1777 days.

(21) Appl. No.: 11/681,616

(22) Filed: Mar. 2, 2007

(65) Prior Publication Data
US 2008/0215323 A1    Sep. 4, 2008

(51) Int. Cl.
*H04M 1/64*    (2006.01)
*H04M 1/725*    (2006.01)

(52) U.S. Cl.
USPC ................... 379/88.04; 379/88.02; 455/412.1

(58) Field of Classification Search
USPC .................................. 379/88.02, 88.04, 88.26
See application file for complete search history.

(56) References Cited

U.S. PATENT DOCUMENTS

| | | | |
|---|---|---|---|
| 5,737,725 A * | 4/1998 | Case | 704/260 |
| 6,032,039 A | 2/2000 | Kaplan | 455/413 |
| 6,934,367 B1 | 8/2005 | LaPierre et al. | 379/88.12 |
| 7,010,100 B1 | 3/2006 | Garg et al. | 379/88.12 |
| 7,065,343 B2 | 6/2006 | Pelaez et al. | 455/412.2 |
| 7,079,630 B2 | 7/2006 | Green et al. | 379/88.17 |
| 2003/0169857 A1 | 9/2003 | Akhteruzzaman et al. | 379/88.01 |
| 2005/0069095 A1* | 3/2005 | Fellenstein et al. | 379/88.02 |
| 2010/0262642 A1* | 10/2010 | Srinivasan | 708/400 |

FOREIGN PATENT DOCUMENTS

EP    1 507 394 A2    2/2005    .............. H04M 3/42

OTHER PUBLICATIONS

"Extension Mobility and Phone Login Features;" Chapter 29; Cisco Call/Manager System Guide; OL-1558-01; pp. 29-1 through 29-8, Sep. 2010.
Notification of Transmittal of the International Search Report and the Written Opinion of the ISA, or the Declaration, ISA/EP (11 pages), Aug. 4, 2008.

* cited by examiner

*Primary Examiner* — Simon Sing
*Assistant Examiner* — Solomon Bezuayehu
(74) *Attorney, Agent, or Firm* — Baker Botts L.L.P.

(57) ABSTRACT

A method for grouping voice messages includes extracting a voice signature from a voice message and tagging the voice message with an identification associated with the voice signature. The method also includes grouping the voice message based on the identification.

32 Claims, 3 Drawing Sheets

METHOD AND SYSTEM FOR GROUPING VOICE MESSAGES

TECHNICAL FIELD OF THE INVENTION

This invention relates in general to communication systems and more particularly to a method and system for grouping voice messages.

BACKGROUND OF THE INVENTION

Recipients of messages, such as voicemail messages, often desire to sort, group, and search messages. Some voicemail message systems provide the ability to sort, group, and search voicemail messages by calling number. Such systems may allow for identity grouping according to a caller identification associated with the calling number. However, if the sender of the message places the call from a different device than the one which is associated with the sender's identity, the system is typically unable to associate the message with the sender. Further, if a caller leaves a message from a location or device having an established identity, then the system may associate the message with the established identity as opposed to that of the actual caller. Moreover, if a voicemail message contains concatenated messages from multiple callers, then the system may only associate the identification of the forwarding device with the message rather than associating each of the individual callers with the message.

A partial solution is provided by extension mobility systems. Such communication systems allow the caller to associate a particular telephone extension with multiple phones. However, this system only allows such interoperability within an enterprise and will not work if the caller is at a customer's site or is using a public phone, cell phone, or home phone.

SUMMARY OF THE INVENTION

The present invention provides a method and system for grouping voice messages that substantially eliminates or reduces at least some of the disadvantages and problems associated with previous methods and systems.

In accordance with one embodiment of the present invention, a method for grouping voice messages includes extracting a voice signature from a voice message and tagging the voice message with an identification associated with the voice signature. The method also includes grouping the voice message based on the identification.

In a more particular embodiment, the method includes comparing the voice signature of a voice message to one or more known voice signatures and matching the voice signature of the voice message to a known voice signature. The method may also include determining that a voice signature of the voice message and a known voice signature do not match and creating a provisional identification for the voice signature of the voice message. Additionally, the method may include prompting an intended recipient of the voice message to provide an identification associated with the voice signature.

In some embodiments, the voice message may include concatenated messages comprising a plurality of voice signatures. In this situation, tagging the voice message with an identification associated with the voice signature comprises associating an identification with each of the plurality of voice signatures.

In another embodiment of the present invention a method for sorting voice messages includes receiving a plurality of voice messages and categorizing the voice messages according to a voice signature associated with each of the voice messages. The method further includes storing the voice messages in a plurality of entries.

A further embodiment of the present invention provides a system for grouping voice messages including a message database and a message server. The message database is operable to store voice messages. The message server is capable of extracting a voice signature from a voice message, tagging the voice message with an identification associated with the voice signature, and distributing the voice message based on the identification.

Technical advantages of certain embodiments of the present invention include providing an ability to sort, group, filter, and/or categorize voice messages according to a caller's voice signature. Thus, if the sender of a message places a call from a device other than the one which is associated with the sender's identity, the system is able to associate the message with the sender. Moreover, if a caller leaves a message from a location or device having an established identity, then the system is functional to associate the message with the identity of the actual caller as opposed to the established identity associated with the device.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
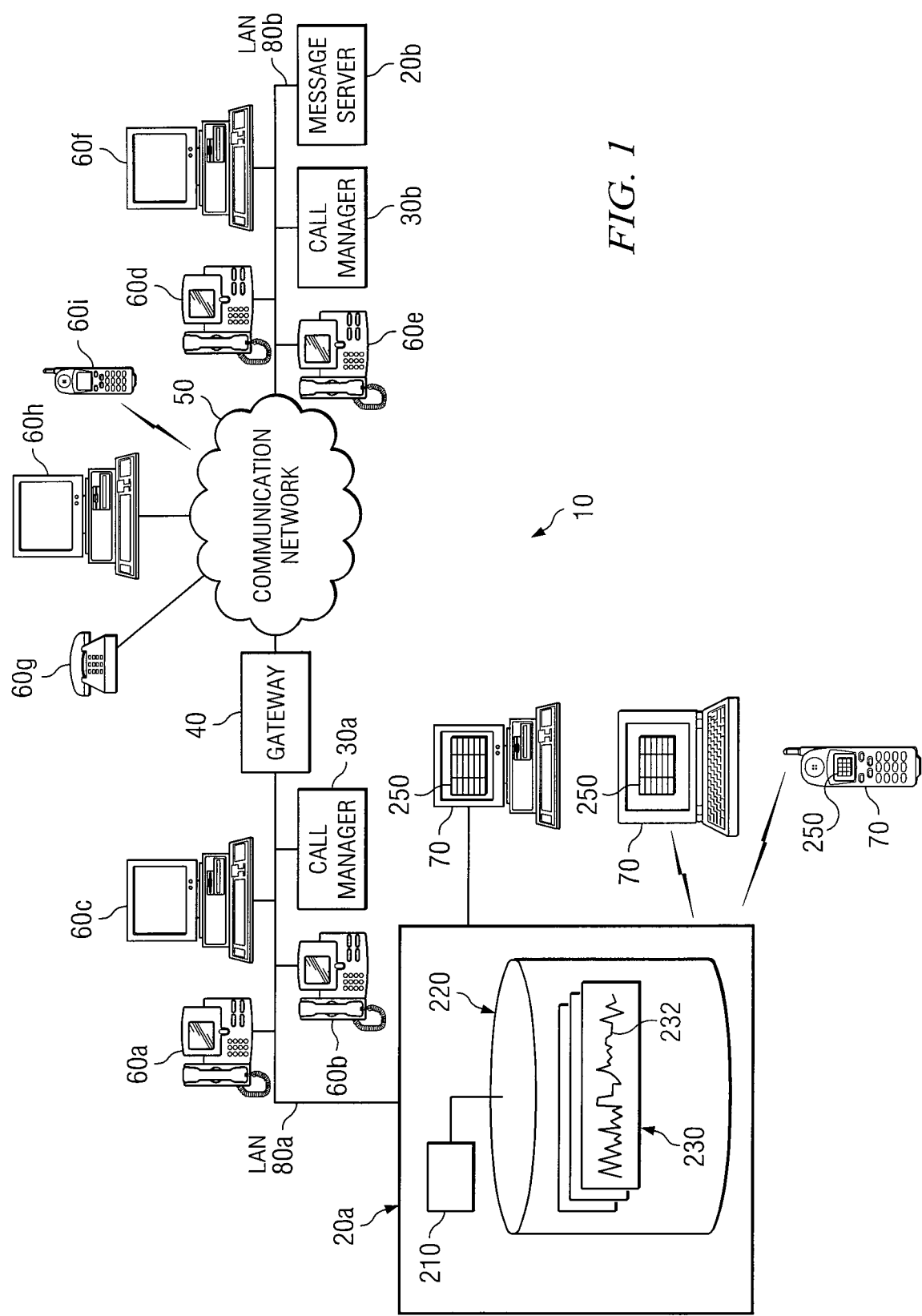
FIG. 1 is a simplified block diagram illustrating a communication system that supports messaging services for a plurality of users according to a particular embodiment of the present invention.

FIG. 1 illustrates a communication system 10 according to a particular embodiment of the present invention. As shown, communication system 10 includes a plurality of local area networks (LANs) 80 coupled by a communication network 50. Each LAN 80 additionally couples a plurality of communication devices 60, a plurality of messaging devices 70, a message server 20, and a call manager 30 to one another and to communication network 50. LAN 80 also includes a gateway 40.

In accordance with the teachings of the present invention, message server 20 is functional to group multi-media messages, such as voicemail messages, based on voice signature(s) of speaker(s) in a message. In a particular embodiment, message server 20 is operable to extract a voice signature from a voice message, compare the voice signature to a stored voice profile, and tag the voice message with an identification associated with a matching voice profile. While particular embodiments are described in detail with respect to voice messaging capabilities, various embodiments may encompass any suitable form of multi-media messaging. Additional embodiments and functionality are described below.

As illustrated in FIG. 1, communication network 50 provides connectivity between components coupled to communication network 50 using any appropriate communication protocols. The term "communication network" should be interpreted as generally defining any network capable of transmitting audio and/or video telecommunication signals, data, and/or messages, including signals, data, or messages transmitted through text chat, instant messaging, e-mail, and phone communications. Accordingly, communication network 50 may comprise all, or a portion of, a radio access network; a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. To facilitate its communication capabilities, communication network 50 may include routers, hubs, switches, gateways, call controllers, and/or any other suitable components in any suitable form or arrangement. Additionally, communication network 50 may represent any hardware and/or software configured to communicate information in the form of packets, cells, frames, segments or other portions of data. Although communication network 50 is illustrated as a single network, communication network 50 may comprise any number or configuration of networks. Moreover, communication system 10 may include any number or configuration of communication networks 50.

Communication devices 60 may represent any suitable combination of hardware, software, and/or encoded logic to provide communication services to a user. For example, communication devices 60 may represent telephones; cell phones; computers running telephony, e-mail, or other forms of messaging and/or communication software; video monitors; cameras; or any other communication hardware, software, and/or encoded logic that supports communication of voice, video, text or other suitable forms of data using communication system 10. In the illustrated embodiment, communication devices 60a, 60b, 60d, and 60e represent Internet Protocol (IP) telephones; communication devices 60c, 60f, and 60h represent telephony-enabled personal computers (PCs); and communication device 60g represents a legacy analog telephone. Additionally, communication device 60i represents a cell phone coupling to communication system 10 through communication network 50. Although FIG. 1 illustrates a particular number and configuration of communication devices 60, communication system 10 contemplates any number or arrangement of such components to support communication of media.

Gateway 40 comprises any suitable combination of hardware and/or software that perform translation functions to facilitate seamless communication between communication network 50 and LAN 80a. These functions may include translation between transmission formats and between communications procedures. In addition, gateway 40 may also translate between audio and video CODECs and perform call setup and clearing on both the LAN side and the communication network side. For example, gateway 40 may interface call manager 30a with communication network 50. As a result, when a call is placed by communication device 60g using communication network 50, gateway 40 translates the call format associated with communication network 50 to a call format associated with call manger 30a such as, for example, Session Initiation Protocol (SIP) or another suitable packet-based communication protocol. Additionally, as suggested by LAN 80b in FIG. 1, LANs 80 may not include a gateway 40.

LANs 80 provide connectivity between components coupled to LANs 80 using any appropriate communication protocols. Additionally, LANs 80 couple such components to communication network 50 to provide connectivity with components coupled to other LANs 80. LANs 80 may represent any hardware and/or software configured to communicate information in the form of packets, cells, frames, segments or other portions of data. LANs 80 may include routers, hubs, switches, gateways, call controllers, and/or any other suitable components in any suitable form or arrangement. In particular embodiments, each LAN 80 represents all or a portion of an Ethernet network connecting the communication devices 60 of a particular entity, such as a company or a university campus.

Call managers 30 comprise any suitable combination of hardware and/or software operable to establish a connection between a calling component of communication system 10 and a called component, such as, for example, connecting a call between communication devices 60 or between a particular communication device 60 and message server 20. In a particular embodiment, call manager 30 comprises a Voice Over Internet Protocol (VOIP) server that performs the functions of signaling and session management within a packet switched telephony network. The session management functionality of call manager 30 provides the ability to control the attributes of an end-to-end call across multiple networks in communication system 10. For example, in particular embodiments, call manger 30 may support SIP, which is a standard for multimedia conferencing over internet protocol. In such embodiments, call manager 30 may comprise a SIP proxy server that handles all call processing, SIP requests, and SIP responses. Although the following description of call manager 30 may relate to portions of SIP, it should be understood that call manager 30 may support other IP telephony protocols such as the H.323 protocol or any other standard or proprietary protocol. In particular embodiments, call managers 30 may also provide a number of telephony services for communication devices 60 and other devices located in LAN 80, including, but not limited to call forwarding, teleconferencing, network monitoring and CODEC translation.

Messaging devices 70 facilitate interaction between users of communication system 10 and message server 20. Depending on the configuration and capabilities of messaging devices 70, messaging devices 70 may communicate with message server 20 wirelessly, over a wired network connection, and/or in any other appropriate manner. Each messaging device 70 may have a display 250, such as a graphical user interface (GUI), to present message information. Additionally, messaging device 70 may permit a relevant user to add to or modify information stored on message server 20. Examples of messaging devices 70 include, but are not limited to, mobile phones, personal digital assistant (PDAs), and/or personal computers (PCs) running appropriate messaging, calendar, task-management, scheduling or personal information manager (PIM) software, such as Microsoft's Outlook or Cisco's Personal Assistant applications. In general, however, each messaging device 70 may represent any appropriate collection of hardware and/or software suitable to provide the described functionality.

Message servers 20a and 20b ("message server 20") support messaging and other call services for communication devices 60 and messaging devices 70. In particular, message server 20 may record voice messages 230, receive voice messages 230 generated by other message servers 20, store voice messages 230, provide users access to stored voice messages 230, forward voice messages 230, and group voice messages 230. Additionally, message server 20 may record and display other data associated with voice messages 230 including, but not limited to, the time a message was recorded, the duration of a message, and an identification number (e.g. caller identification "Caller ID" number) corresponding to the communication device 60 from which a message was sent. While the voice messaging capabilities of message server 20 are highlighted, it should be noted that message server 20 may also support short message service (SMS) messages, e-mail messages, or messages of any other form, including but not limited to audio, text, and/or video messages. In certain embodiments, message server 20 may provide unified messaging capabilities, thereby integrating different message streams (IM, e-mail, voice, fax, video, etc.). Message server 20 may include any appropriate combination of hardware and/or software suitable to provide the described messaging functionality. In the illustrated embodiment, message servers 20 include a processor 210 and memory 220. The contents and operation of particular embodiments of message servers 20 are described in greater detail below with respect to FIG. 2.

In operation, message server 20 groups voice messages 230 according to an identification corresponding to a voice signature 232 and provides this information to messaging devices 70. A user may then search, sort, and/or filter voice messages 230. In particular embodiments, message server 20 may record voice messages 230 from a caller. Additionally, message server 20 may also manage messages having different data types and media streams including, but not limited to, e-mail, text, and IM.

FIG. 1 illustrates the general interaction of the components of communication system 10 in accordance with an embodiment of the present invention. In this example, a user (referred to here as the "sender") using a communication device 60, for instance communication device 60d, may place a call to another user (referred to here as the "recipient") of communication system 10 associated with another communication device 60, communication device 60b in this example. Call manager 30 attempts to connect the incoming call to communication device 60b. If the recipient does not answer the incoming call, call manager 30 may forward the incoming call to message server 20 so that the sender may record a voice message for the recipient. For purposes of this description, a call may represent any audio, video, and/or text-based communication session and may include signals, data, or messages transmitted through voice devices, text chat, web sessions, facsimile, instant messaging and e-mail. In addition, it should be noted that message servers 20 may be operable to forward voice messages sent by a sender who does not call the destination extension (i.e. phone number), but rather forwards a message to the destination extension.

Figure 2:
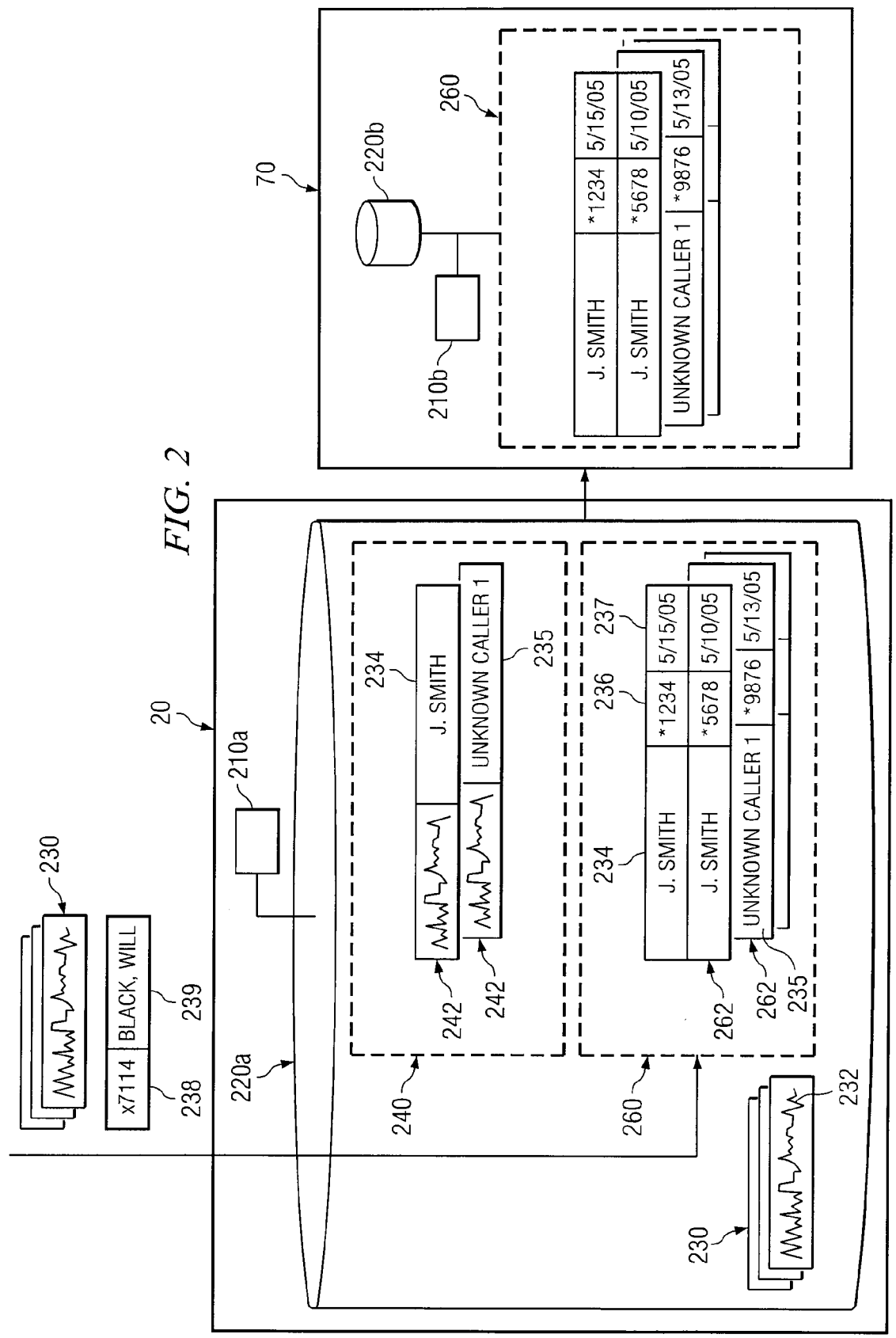
FIG. 2 is a simplified block diagram illustrating the operation of a message server in accordance with a particular embodiment of the present invention.

With reference now to FIG. 2, the contents and operation of message server 20 are illustrated in accordance with a particular embodiment of the present invention. Also shown in FIG. 2 is a messaging device 70 capable of displaying message database 260 and/or playing voice messages 230. As illustrated, message server 20 and messaging device 70 each include a processor 210a and 210b, respectively, as well as a memory unit 220a and 220b, respectively.

Processors 210a and 210b ("processor 210") are operable to execute instructions associated with the services provided by message server 20 and messaging device 70, respectively. Processor 210 may represent any suitable device(s) capable of processing and/or communicating electronic information. Examples of processor 210 include, but are not limited to, application-specific integrated circuits (ASICs), field-programmable gate arrays (FGPAs), digital signal processors (DSPs), and any other suitable specific or general purpose processors.

Memory units 220a and 220b ("memory unit 220") may store processor instructions and/or any other appropriate information used by message server 20 and messaging device 70. As illustrated in FIG. 2, memory unit 220 comprises voice messages 230, directory 240, and message database 260. In addition, memory unit 220 may include any collection and arrangement of volatile or non-volatile, local or remote devices suitable for storing data. Examples of memory unit 220 include, but are not limited to random access memory (RAM) devices, dynamic random access memory (DRAM), read only memory (ROM) devices, magnetic storage devices, optical storage devices, flash memory, or any other suitable data storage devices.

Voice message 230 may be any transmission or recording having an acoustic, vocal, or video component. In particular, voice message 230 may be a spoken message recorded by, or forwarded to, message server 220. In a particular embodiment, voice message 230 may be a greeting associated with a user of communication system 10 of FIG. 1. As represented in FIG. 2, voice message 230 includes voice signature 232. A voice signature is a biometric corresponding to a speaker's distinct voice and speech characteristics. A voice signature may be unique to any given individual. Thus, a voice signature may be used to recognize or verify a speaker's identity, similar to a fingerprint. In particular, a voice signature may comprise any combination of acoustic data such as voice tone, pitch, rhythm, speaking pattern, or any other distinctive vocal or speech trait.

Directory 240 may be any database or repository for cataloging voice profiles 242. While directory 240 is illustrated as a component of memory unit 220, it is envisioned that directory 240, and thus voice profiles 242, may reside anywhere within communication system 10 of FIG. 1, including within messaging devices 70. It is further envisioned that more than one directory 240 may reside within communication system 10.

A voice profile 242 represents a stored voice signature having an assigned identity. The components of the voice signature contained in voice profile 242 may be substantially similar to those previously recited in relation to voice signature 232. In a particular embodiment, the assigned identity may include a sender/user profile 234 comprising data such as name, address, e-mail address, telephone number, business information, and/or any other information which may be transmitted through communication system 10. Additionally, the assigned identity may be a provisional identification 235. A provisional identification is a tag marking a voice signature for which no specific sender/user profile corresponding to the voice signature of voice profile 242 exists. For example, a provisional identification 235 may simply tag a stored voice signature of voice profile 242 as "unknown caller 1." By contrast, if a sender/user profile has been created, then message server 20 may identify the voice profile 242 by a specific identity such as "J. Smith." It should be noted that a user may update, and/or replace, the provisional identification 235 by creating a sender/user profile 234 for voice profile 242.

Message database 260 may comprise any suitable combination of hardware and/or software for storing and managing voice messages 230 as well as any other messages (text, e-mail, SMS, video, etc.). In certain embodiments, message database 260 may serve a single messaging device 70 associated with a particular user. In other embodiments, a single message database 260 may serve multiple users, and thus multiple messaging devices 70. As illustrated in FIG. 2, message database 260 includes entries 262. Entries 262 may be used to sort, categorize and/or group messages. For instance, an entry 262 may contain messages from a particular sender based on the voice signature, messages of a certain data type, or flagged messages. Additionally, message database 260 may allow a user at messaging device 70 to group, sort, categorize, filter, and/or search voice messages 230, as well as other messages, in entries 262. Although message database 260 is illustrated as being a single component of memory 220, one skilled in the art will recognize that message database 260 may be any number of separate devices located anywhere within communication system 10. In particular, message database 260 may be a component of messaging device 70. Further, message database 260 may include any suitable number or combination of entries 262.

In the embodiment of the invention illustrated in FIG. 2, message server 20 may either receive a missed call forwarded by an associated call manager 30, or receive a forwarded voice message 230. If message server 20 receives a missed call, it may prompt the sender to create a voice message 230 and then record the message. As part of receiving the missed call or voice message 230, message server may also receive information associated with the call such as caller ID information 236 corresponding to the device sending the call. In a certain embodiment, message server 20 is operable to receive one or more call signaling messages, such as SIP invite messages that contain a called party identifier 239 that identifies a recipient for the missed call or that include a called device identifier 238 that identifies a phone number or an IP address of the destination device associated with the call. In addition, message server 20 may also receive or create a timestamp 237 indicating the time the voice message was generated.

In response to receiving/recording voice message 230, message server 20 extracts voice signature 232 from the message and tags each with an identification. As discussed, voice signature 232 may be any combination of data related to a speaker's voice and speech attributes. The tag may be an assigned identity corresponding to a voice profile 242 (e.g. sender/user profile 234 or provisional identification) or a new provisional identification. If voice signature 232 matches a voice signature of a voice profile 242, then the tag may be the assigned identity associated with the matching voice profile 242. By contrast, if voice signature 232 does not match a voice signature of a stored voice profile 242, then message server 20 may generate a provisional identification 235 for voice message 230 and voice signature 232. As used herein, a "match" references the situation where voice message 230 is identified to be left by the user having voice profile 242.

Determining whether a match exists involves comparing voice signature 232 of message 230 with the voice signature of a voice profile 242. To compare voice signatures, message server 20 may employ any speaker recognition technique including speaker verification or speaker identification technology. Such technology may incorporate any combination of pattern matching algorithms and utilize both biometric and behavioral biometric components of the voice signatures. In response to determining that a match exists, message server 20 may tag and distribute voice message 230 to a particular entry (or entries) 262 of message database 260. If directory 240 does not contain a voice profile 242 having a voice signature that matches voice signature 232, message server 20 may generate a new voice profile 242 for voice signature 232. Because the new voice profile 242 will not have an identification, message server 20 may also generate a provisional identification 235 to tag the new voice profile 242 and voice message 230. After tagging voice message 230 with the provisional identification, message server 20 may forward the message to a particular entry 262 of message database 260. In particular, message server 20 may forward the voice message 230 to a entry 262 that contains messages having identical voice profiles 242. Message server 20 may also update directory 240 with the new voice profile 242. This enables message server 20 to group a later voice message 230 left by the same unidentified sender that left a prior message. Accordingly, message server 232 is operable to group voice messages 230 based on a speaker's voice signature.

As a result of advances in communication technologies, a voice message 230 may contain concatenated messages from multiple people. For example, a sender may forward a voice message 230 and include additional comments. Thus, voice message 230 might contain multiple voice signatures 232. For each unique voice signature 232 contained in voice message 230, message server 20 may follow the comparing/matching procedure described above. In such a situation, message server 20 may distribute voice message 230 to multiple entries 262 of message database 260. Alternatively, the system may distribute the message into a box associated with both voice signatures. Thus, the user may be able to search messages that have voice signatures from multiple people. To illustrate, a user may choose to list all messages that are both from "Joe" and "Alice." The messaging system may then return messages that were originally from Joe to Alice but were forwarded to the user by Alice along with her comments, as messages that wee originally from Alice to Joe but were forwarded to the user with Joe's comments.

In a particular embodiment of the present invention, message server 20 may prompt a user to identify a sender. For instance, if voice message 230 is tagged with a provisional identification, then message server 20 may prompt a user to create a sender/user profile 234 to associate with voice profile 242 of the sender. As an example, the prompt may be an audio or video message which requests the user to identify the sender and may be displayed or broadcasted by messaging device 70. To facilitate the creation of a sender/user profile, messaging device 70 may include a user interface, such as a graphical user interface (GUI), video user interface (VUI), or a textual user interface (TUI). In response to a user creating a sender/user profile, message server 20 may replace the provisional identification 235 associated with the voice profile 242 with the sender/user profile. Message server 20 may also update voice messages 230 already distributed to message database 260 with the information provided in the sender/user profile.

In another embodiment of the present invention, message server 20 may be located within an enterprise. Accordingly, directory 240 may be an enterprise directory that maintains voice signatures of individuals associated with the enterprise. As an example, directory 240 may use voicemail greetings, as well as other means, to capture voice signatures of individuals associated with the enterprise. In this embodiment, message server 20 may be operable to group voice messages left by a sender associated with the enterprise even if the sender calls from a device that is not associated with the enterprise.

As another example, users associated with an enterprise may each have an individual directory 240 containing personal contacts having voice profiles 242. As used herein, a "personal contact" is a person that is not associated with the enterprise. If a user associated with the enterprise elects to make an individual directory 240 public (i.e. accessible to the entire enterprise), then message server 20 may update an enterprise directory with the voice profiles 242 of the personal contacts, or alternatively, directly access the individual directory 240 to enhance the message grouping capabilities within the enterprise. To illustrate, "Jill" a personal contact having a voice profile stored in the individual directory of "Rob," may leave a message for "Sara" who is also associated with the enterprise. If Rob's individual directory is public, message server 20 may obtain Jill's voice profile and thereby tag the message left for Sara with Jill's sender/user profile.

In certain embodiments, message server 20 and messaging device 70 are operable to provide multiple sorting, searching, categorizing, and/or filtering resources. For instance, the system of the present invention may provide unified messaging capabilities, thereby permitting a user to search various streams (IM, video, text, voice, etc.) of messages with a single search query. Combining such functions with the voice signature grouping capabilities of message server 20 allows a user to sort, search, and filter messages regardless of the device from which the message was sent. To illustrate, a user may search for messages from "J. Smith." In response, the system may return all messages from J. Smith including, but not limited to, voice, e-mail, text, video, and IM messages. Further, the system may provide layered search capabilities. Thus, when the messages from J. Smith are returned, the user may sort/filter the messages according to modality type, time, importance, etc. In addition, a user may filter in or out messages from a specific caller according to the voice profile 242 associated with the caller. For example, a user may elect to delete all voice messages from the caller, and this can be done simultaneously with listening to the message from the caller. Therefore, if "Bob" is listening to a voicemail from "Alice" and decides to delete all voice messages from Alice, then he may select an option to delete (or other operation such as move to a specific folder, mark message as heard, flag the message, etc.) all voice messages from the current user. While specific searching, sorting, and filtering capabilities have been described in detail, the recited features are provided as examples and should not limit the scope of the present invention.

To facilitate the described searching, sorting, and filtering capabilities, message server 20 and/or messaging device 70 may include any number or combination of various features. For instance, message server 20 and/or messaging device 70 may provide a user with an interactive voice response (IVR) menu to sort messages in message database 260. Thus, the user may combine listening to all messages from a given person. The IVR menu may further allow the user to skip from one group of messages to another, thereby permitting the user to skip all messages from one caller and move onto messages from another person and so on. Additionally, messaging device 70 may include a display 250 such as a laptop or PDA screen to present a textual or graphical representation of message database 260. In a particular embodiment, the display includes a GUI which contains a drag and drop and/or a simple text search interface. If a user inputs the name of a caller/sender into the interface, then all messages from the particular caller may be returned and displayed on the GUI. In another embodiment, a user may filter in or out voice messages from a specific caller. For example, a user may delete all voicemails left by a particular caller/sender and this may be done while the user is listening to a voice message from the user. Although several searching, sorting, and filtering features have been discussed, one skilled in the art will readily recognize that numerous other features may fall within the scope of the present invention.

Figure 3:
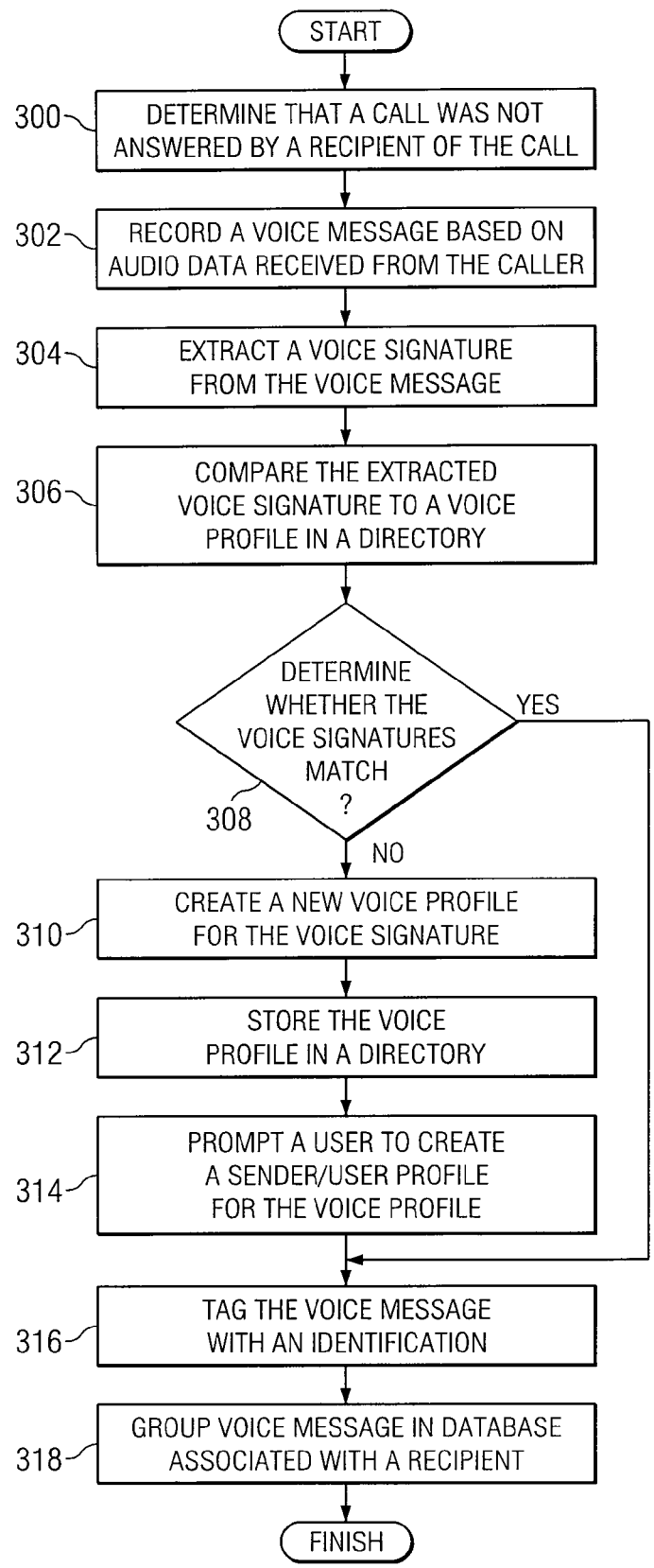
FIG. 3 is a flowchart illustrating a method for grouping voice messages in accordance with a particular embodiment of the present invention.

FIG. 3 illustrates a flowchart describing an example operation of a particular embodiment of message server 20 in grouping voice messages 230. In the described embodiment, message server groups voice messages 230 based on voice signatures 232 of the voice messages 230.

The described process begins at step 300 with message server 20 determining that a call was not answered by a recipient of the call. As noted above, the call may represent any audio, video, and/or text-based communication session and may include signals, data, or messages transmitted through voice devices, text chat, web sessions, facsimile, instant messaging, and e-mail. In particular embodiments of communication system 10, message server 20 determines that the call was not answered as a result of the call being forwarded to message server 20 by call manager 30. The message server may then prompt the caller to leave a message. At step 302, message server 20 generates a voice message 230 based on audio data received from the communication device 60 that the caller is using to place the incoming call. In particular embodiments, message server 20 generates and records voice message 230. In other embodiments, voice message 230 may be forwarded to message server 20 from another message server 20.

After recording voice message 230, message server 20 extracts a voice signature 232 from the message at step 304. As discussed, a voice signature may comprise any data associated with a speaker's voice. At step 306, message server 20 compares the extracted voice signature 232 to a voice signature of a voice profile 242 stored in directory 240. To compare voice signatures, message server 20 may use any speaker recognition technique, or pattern recognition algorithm. In some embodiments, the system first attempts to compare the voice signature associated with the caller ID and/or the phone number or the IP address of the caller.

At step 308, message server 20 may determine whether any of the voice signatures associated with voice profiles 242 in directory 240 match the extracted voice signature 232. If voice signature 232 matches a voice signature associated with a voice profile 242, then the operation may continue at step 316. If none of the voice profiles 242 of directory 240 contain a voice signature that matches the extracted voice signature 232, message server 20 may, at step 310, generate a voice profile 242 which includes the non-matching voice signature 232. Because the voice signature 232 does not have a matching voice profile 242, the generated voice profile may have a provisional identification. As mentioned, a provisional identification is a tag which marks a voice signature without a sender/user profile. In response to generating the new voice profile 242, message server 20 may store the voice profile 242 in directory 240 at step 312. Additionally, at step 314, message server may prompt a user to create a sender/user profile 234 to replace the provisional identification 235 associated with the newly generated voice profile 242.

Whether or not a match occurs, message server 20 tags voice message 230 with an identification at step 316. If a match exists, then the tag may be the identification associated with the matching voice profile 242. In this case, the tag may be a sender/user profile 234 and/or a provisional identification 235 if a sender/user profile 234 has not been created. If a matching voice profile 242 was not found in directory 240, then the tag may be the provisional identification 235 associated with the newly created voice profile 242 for voice signature 230. After tagging voice message 230, message server 20 may, at step 318, group voice message 230 with an entry 262 of message database 260 according to the identification associated with voice message 230. In embodiments, the grouping is performed using a set of pointers that associate the message with a specific entry 262.

One skilled in the art will readily recognize that some of the steps illustrated in FIG. 3 may be combined, modified or deleted where appropriate, and additional steps may also be added to the flowchart. Additionally, steps may be performed in any suitable order without departing from the scope of the invention.

Further, although the present invention has been described in detail with reference to particular embodiments, it should be understood that various other changes, substitutions, and alterations may be made hereto without departing from the spirit and scope of the present invention. For example, although particular embodiments have been described with reference to a number of elements included within a message system, these elements may be combined, rearranged or positioned in order to accommodate particular needs. In addition, any of these elements may be provided as separate external components to a message system or message server where appropriate. Moreover, embodiments of the invention have been described in detail with respect to voice messaging, the scope of the invention is intended to include all forms of multi-media messaging. Particular embodiments contemplate great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method, performed by apparatus, for grouping voice messages, comprising:
   extracting a plurality of voice signatures from a voice message, wherein the voice message comprises a set of concatenated messages, the set of concatenated messages comprising the plurality of voice signatures, each voice signature of the plurality of voice signatures comprising a respective metric corresponding to a unique voice characteristic of a respective person;
   tagging the voice message with identifications associated with the plurality of voice signatures, wherein tagging the voice message with identifications associated with the plurality of voice signatures comprises associating a respective voice signature identification identifying a person with each of the plurality of voice signatures; and
   grouping the voice message with one or more entries based on the tagged identifications.

2. The method of claim 1, further comprising, prior to tagging the voice message with identifications associated with the plurality of voice signatures:
   comparing at least one of the voice signatures of the voice message to one or more known voice signatures; and
   matching the at least one of the voice signatures of the voice message to one of the one or more known voice signatures.

3. The method of claim 1, wherein tagging the voice message with identifications associated with the plurality of voice signatures comprises:
   prompting an intended recipient of the voice message to provide an identification associated with at least one of the voice signatures; and
   receiving the identification associated with the at least one voice signature.

4. The method of claim 1, further comprising prior to tagging the voice message with identifications associated with the plurality of voice signatures:
   comparing at least one of the voice signatures of the voice message to a known voice signature;
   determining that the at least one of the voice signatures of the voice message and the known voice signature do not match; and
   creating a provisional identification for the at least one of the voice signatures of the voice message.

5. The method of claim 1, further comprising updating a directory with an identification associated with at least one of the voice signatures.

6. The method of claim 1, further comprising communicating at least one identification associated with the plurality of voice signatures to an intended recipient of the voice message.

7. The method of claim 1, further comprising:
   searching a directory for a corresponding voice signature that corresponds to at least one of the extracted voice signatures, the directory comprising a plurality of voice signatures;
   matching the at least one of the extracted voice signatures to the corresponding voice signature from the directory.

8. The method of claim 1, further comprising searching a plurality of voice messages according to at least one of the voice signatures.

9. A system for grouping voice messages comprising:
   a memory operable to store voice messages; and
   a processor coupled to the memory and operable to:
      extract a plurality of voice signatures from a voice message, wherein the voice message comprises a set of concatenated messages, the set of concatenated messages comprising a plurality of voice signatures, each voice signature of the plurality of voice signatures comprising a respective metric corresponding to a unique voice characteristic of a respective person;
      tag the voice message with identifications associated with the plurality of voice signatures, wherein a processor operable to tag the voice message with identifications associated with the plurality of voice signatures comprises a processor operable to associate a respective voice signature identification identifying a person with each of the plurality of voice signatures; and
      group the voice message with one or more entries based on the tagged identifications.

10. The system of claim 9, wherein the processor is further operable to, prior to tagging the voice message with identifications associated with the plurality of voice signatures:
   compare at least one of the voice signatures of the voice message to one or more known voice signatures; and
   match the at least one of the voice signatures of the voice message to one of the one or more known voice signatures.

11. The system of claim 9, wherein a processor operable to tag the voice message with identifications associated with the plurality of voice signatures comprises a processor operable to:
   prompt an intended recipient of the voice message to provide an identification associated with at least one of the voice signatures; and
   receive the identification associated with the at least one voice signature.

12. The system of claim 9, wherein the processor is further operable to, prior to tagging the voice message with identifications associated with the plurality of voice signatures:
   compare at least one of the voice signatures of the voice message to a known voice signature;
   determine that the at least one of the voice signatures of the voice message and the known voice signature do not match; and create a provisional identification for the at least one of the voice signatures of the voice message.

13. The system of claim 9, wherein the processor is further operable to update a directory with an identification associated with at least one of the voice signatures.

14. The system of claim 9, wherein the processor is further operable to communicate at least one identification associated with the plurality of voice signatures to an intended recipient of the voice message.

15. A non-transitory computer readable medium embedded with code which when executed cause a processor to:
   extract a plurality of voice signatures from a voice message, wherein the voice message comprises a set of concatenated messages, the set of concatenated messages comprising a plurality of voice signatures, each voice signature of the plurality of voice signatures comprising a respective metric corresponding to a unique voice characteristic of a respective person;
   tag the voice message with identifications associated with the plurality of voice signatures, wherein the code operable to tag the voice message with identifications associated with the plurality of voice signatures comprises code operable to associate a respective voice signature identification identifying a person with each of the plurality of voice signatures; and
   group the voice message with one or more entries based on the tagged identifications.

16. The non-transitory computer readable medium of claim 15, wherein the code is further causing the processor, prior to tagging the voice message with identifications associated with the plurality of voice signatures:
   compare at least one of the voice signatures of the voice message to one or more known voice signatures; and
   match the at least one of the voice signatures of the voice message to one of the one or more known voice signatures.

17. The non-transitory computer readable medium of claim 15, wherein code causing the processor tag the voice message with identifications associated with the plurality of voice signatures comprises code operable to:
   prompt an intended recipient of the voice message to provide an identification associated with at least one of the voice signatures; and
   receive the identification associated with the at least one voice signature.

18. The non-transitory computer readable medium of claim 15, wherein the code is further operable to, prior to tagging the voice message with identifications associated with the plurality of voice signatures:
   compare at least one of the voice signatures of the voice message to a known voice signature;
   determine that the at least one of the voice signatures of the voice message and the known voice signature do not match; and
   create a provisional identification for the at least one of the voice signatures of the voice message.

19. The non-transitory computer readable medium of claim 15, wherein the code is further operable to update a directory with an identification associated with at least one of the voice signatures.

20. The non-transitory computer readable medium of claim 15, wherein the code is further operable to communicate at least one identification associated with the plurality of voice signatures to an intended recipient of the voice message.

21. The non-transitory computer readable medium of claim 15, wherein the code is further operable to:
   search a directory for a corresponding voice signature that corresponds to at least one of the extracted voice signatures, the directory comprising a plurality of voice signatures;
   match the at least one of the extracted voice signatures to the corresponding voice signature from the directory.

22. The non-transitory computer readable medium of claim 15, wherein the code is further causing the processor search a plurality of voice messages according to at least one of the voice signatures.

23. A system for grouping voice messages comprising:
   means for extracting a plurality of voice signatures from a voice message, wherein the voice message comprises a set of concatenated messages, the set of concatenated messages comprising a plurality of voice signatures, each voice signature of the plurality of voice signatures comprising a respective metric corresponding to a unique voice characteristic of a respective person;
   means for tagging the voice message with identifications associated with the plurality of voice signatures, wherein means for tagging the voice message with identifications associated with the plurality of voice signatures comprises means for associating a respective voice signature identification identifying a person with each of the plurality of voice signatures; and
   means for grouping the voice message with one or more entries based on the tagged identifications.

24. A method, performed by apparatus, for sorting voice messages, comprising:
   receiving a plurality of voice messages, the plurality of voice messages each comprising a one or more voice signatures associated with the voice message, wherein at least one of the plurality of voice messages comprises a set of concatenated messages, the set of concatenated messages comprising a plurality of voice signatures, each voice signature of the plurality of voice signatures comprising a respective metric corresponding to a unique voice characteristic of a respective person;
   categorizing the plurality of voice messages according to the one or more voice signatures associated with each of the voice messages, wherein categorizing the plurality of voice messages according to the one or more voice signatures associated with each of the voice messages comprises distributing the set of concatenated messages to a plurality of entries; and
   storing the plurality of voice messages in a plurality of entries, each of the plurality of entries comprising voice messages having matching voice signatures.

25. The method of claim 24, wherein each of the plurality of voice signatures is associated with a voice profile.

26. The method of claim 24, further comprising tagging the plurality of voice messages with one or more identifications, each identification associated with each of the one or more voice signatures associated with each of the plurality of voice messages.

27. A system for sorting voice messages comprising:
   a processor operable to:
      receive a plurality of voice messages, the plurality of voice messages each comprising a one or more voice signatures associated with the voice message, wherein at least one of the plurality of voice messages comprises a set of concatenated messages, the set of concatenated messages comprising a plurality of voice signatures, each voice signature of the plurality of voice signatures comprising a respective metric corresponding to a unique voice characteristic of a respective person;

categorize the plurality of voice messages according to the one or more voice signatures associated with each of the voice messages, wherein a processor operable to categorize the plurality of voice messages according to the one or more voice signatures associated with each of the voice messages comprises a processor operable to distribute the set of concatenated messages to a plurality of entries; and a memory coupled to the processor and operable to:
store the plurality of voice messages in a plurality of entries, each of the plurality of entries comprising voice messages having matching voice signatures.

28. The system of claim 27, wherein each of the plurality of voice signatures is associated with a voice profile.

29. The system of claim 27, wherein the processor is further operable to tag the plurality of voice messages with one or more identifications each identification associated with each of the one or more voice signatures associated with each of the plurality of voice messages.

30. A non-transitory computer readable medium embedded with code which when executed cause a processor to:
receive a plurality of voice messages, the plurality of voice messages each comprising a one or more voice signatures associated with the voice message, wherein at least one of the plurality of voice messages comprises a set of concatenated messages, the set of concatenated messages comprising a plurality of voice signatures, each voice signature of the plurality of voice signatures comprising a respective metric corresponding to a unique voice characteristic of a respective person;

categorize a plurality of voice messages according to the one or more voice signatures associated with each of the voice messages, wherein the code operable to categorize the plurality of voice messages according to the one or more voice signatures associated with each of the voice messages comprises code operable to distribute the set of concatenated messages to a plurality of entries; and store the plurality of voice messages in a plurality of entries, each of the plurality of entries comprising voice messages having matching voice signatures.

31. The non-transitory computer readable medium of claim 30, wherein each of the plurality of voice signatures is associated with a voice profile.

32. The non-transitory computer readable medium of claim 30, wherein the code is further causing the processor tag the plurality of voice messages with one or more identifications, each identification associated with each of the one or more voice signatures associated with each of the plurality of voice messages.

* * * * *